United States Patent [19]

Smolik

[11] Patent Number: 4,538,354
[45] Date of Patent: Sep. 3, 1985

[54] MAGNETIC TEMPLATE

[76] Inventor: Robert A. Smolik, 670 W. Seventh St., St. Paul, Minn. 55102

[21] Appl. No.: 531,672

[22] Filed: Sep. 13, 1983

[51] Int. Cl.³ .............................................. G01B 3/14
[52] U.S. Cl. ............................ 408/72 B; 33/DIG. 1; 33/563
[58] Field of Search .............. 33/174 G, 185 R, 191, 33/DIG. 1, 189, 203, 197; 408/115 R, 115 B, 72 R, 72 B, 241 R, 241 B, 76; 409/130; 269/8; 335/303, 285

[56] References Cited

U.S. PATENT DOCUMENTS

| | | | |
|---|---|---|---|
| 2,367,582 | 1/1945 | Honyoust | 33/185 R X |
| 2,580,099 | 12/1951 | Jaeger | 335/285 |
| 2,634,507 | 4/1953 | Boatwright . | |
| 2,647,325 | 8/1953 | Little . | |
| 2,949,798 | 8/1960 | Berta | 33/174 G X |
| 3,046,818 | 7/1962 | Saha | 408/115 X |
| 3,062,075 | 11/1962 | Saha | 408/115 X |
| 3,859,002 | 1/1975 | Sauey | 408/72 R X |
| 3,942,147 | 3/1976 | Josephson | 335/303 X |
| 4,257,166 | 3/1981 | Barker et al. . | |
| 4,291,467 | 9/1981 | Schultz | 33/174 G X |
| 4,345,381 | 8/1982 | Brislin . | |
| 4,356,849 | 11/1982 | Fredrickson . | |
| 4,372,050 | 2/1983 | Eisenhauer . | |

FOREIGN PATENT DOCUMENTS

| | | | |
|---|---|---|---|
| 2360370 | 4/1978 | France | 408/115 R |
| 2092488 | 8/1982 | United Kingdom | 408/115 R |

Primary Examiner—Harry N. Haroian
Attorney, Agent, or Firm—Burd, Bartz & Gutenkauf

[57] ABSTRACT

A magnetically adhering template having a flat, rigid base and a flexible magnetized pad fixed to and substantially coextensive with the base. Template openings of desired shape and location are provided in the base. Corresponding openings are provided in the magnetized pad and are desirably slightly larger than those in the base so that portions of the pad adjacent the pad openings do not interfere with the use of the template openings of the base. The template is useable on a surface of magnetically attractive material, such as a steel wall stud.

11 Claims, 5 Drawing Figures

MAGNETIC TEMPLATE

BACKGROUND OF THE INVENTION

The invention pertains to a magnetically adhering template for use in the location or formation of holes in a magnetically attractive surface. Templates are commonly used in the formation of holes in hard surfaces, not only to achieve a particularly desired shape of opening but also to properly locate an opening with respect to a reference point on the structure, such as an edge. The template opening is useable to mark the boundaries of an intended opening or to guide a cutting tool in the formation of the opening. In construction endeavors, templates are useable in the formation of drill holes to be used for the mounting of structure. See, for example, U.S. Pat. No. 4,257,166 to Barker et al issued Mar. 24, 1981. In building construction, there is frequently a need to mark and drill construction components, such as wall studs, for the mounting of electrical receptacle boxes. In particular, as shown in co-pending application Ser. No. 399,473 filed July 19, 1982, now U.S. Pat. No. 4,403,708 issued Sept. 13, 1983, there can be a need for the formation of a pattern of four holes in a metal wall stud preparatory to the mounting of an electrical receptacle box of the type having mounting arms or tines which are inserted in the holes to mount the box.

SUMMARY OF THE INVENTION

The invention pertains to a magnetically adhering template having a flat, rigid base and a flexible magnetized pad fixed to and substantially coextensive with the base. Template openings of desired shape and location are provided in the base. Corresponding openings are provided in the magnetized pad and are desirably slightly larger than those in the base so that portions of the pad adjacent the pad openings do not interfere with the use of the template openings of the base. The template is useable on a surface of magnetically attractive material, such as a steel wall stud. The magnetized pad is of a flexible material, such as plastic, impregnated with magnetic material. It adheres to the base either magnetically or is bonded by other means. A right angle flange can be provided along one edge of the base to properly locate the base with respect to a reference edge on structure to be worked upon. The template is placed upon the structure with the magnetic pad in surface contact whereby the template is magnetically adhered to the structure. The template openings can be comprised as drill holes to guide a drill bit in forming mounting holes in the structure.

IN THE DRAWINGS

DESCRIPTION OF A PREFERRED EMBODIMENT

Figure 2:
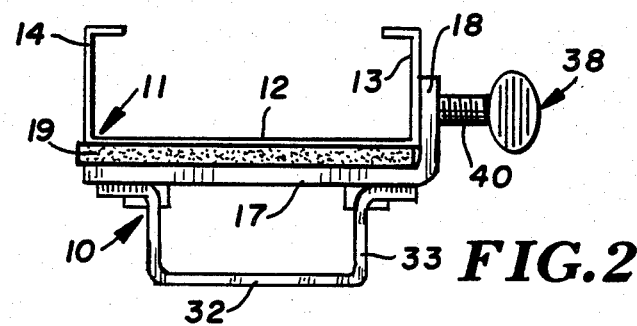
FIG. 2 is a top end view of the template of FIG. 1 installed on a wall stud.
Figure 1:
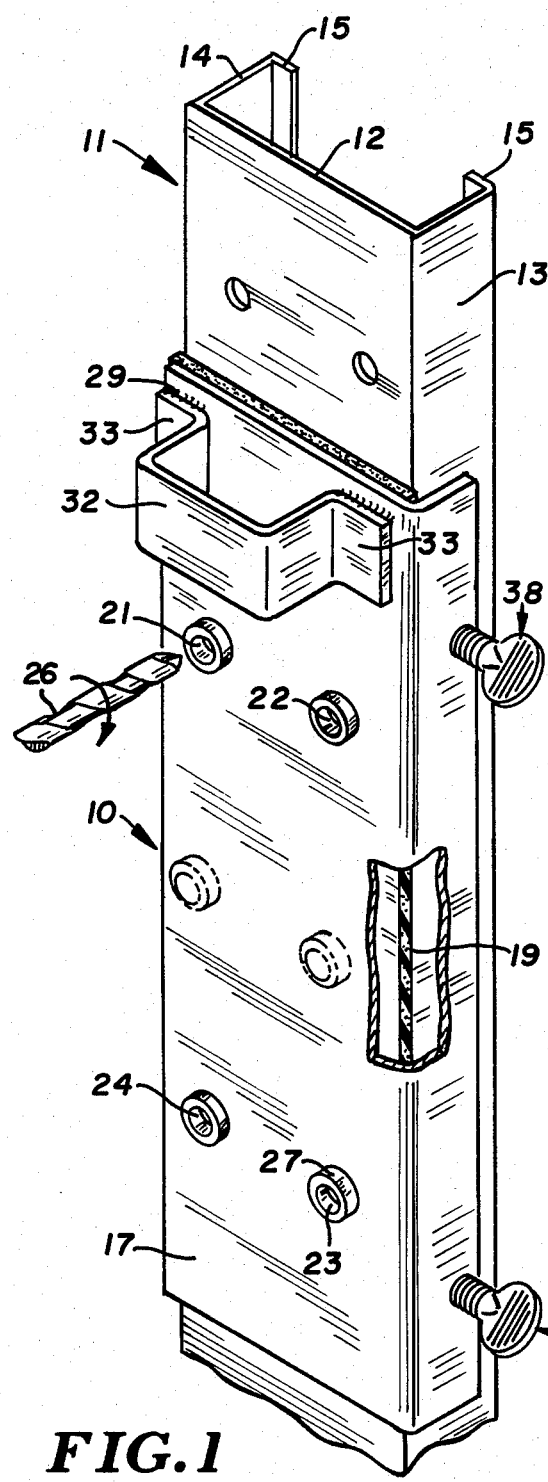
FIG. 1 is a perspective view of a template according to the invention mounted on a segment of metal wall stud prepatory to the formation of mounting holes in the wall stud.
Figure 3:
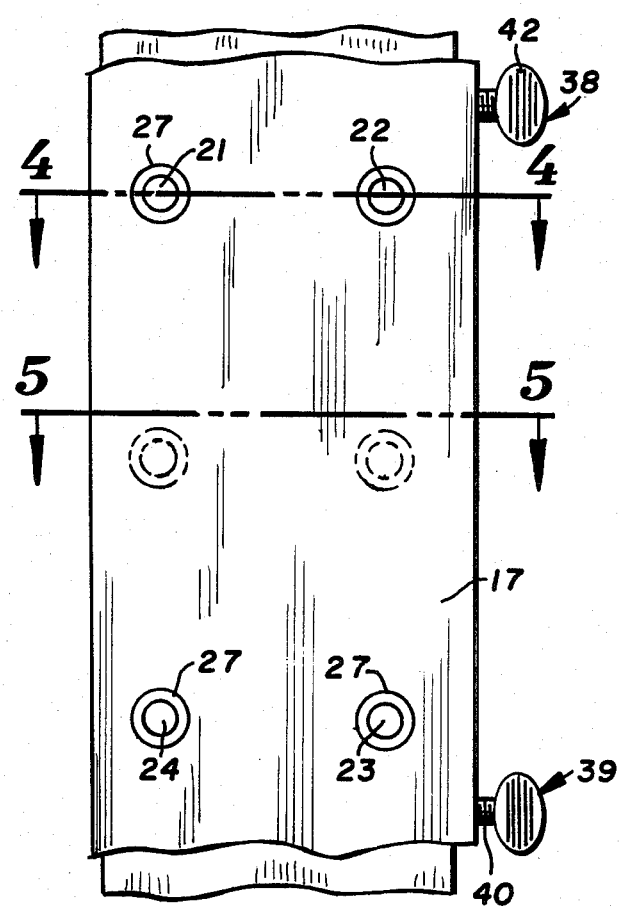
FIG. 3 is an enlarged front elevational view of a portion of the template of FIG. 1.

Referring to the drawings, there is shown in FIGS. 1 through 3 a template indicated generally at 10 according to the present invention temporarily mounted on a metal wall stud 11 of the type used in building construction. Wall stud 11 is of the type having a generally U-shaped cross section with major side member 12 and perpendicular end members 13, 14 extended from edges of major side member 12, as well as inwardly turned lips 15. Template 10 includes an L-shaped body member having a elongate, generally rectangular, flat base 17 and a right angle flange 18 extended perpendicularly from one edge of base 17. Base 17 and flange 18 are formed of hard material that can be magnetically attractive, such as steel. A flexible magnetized pad 19 is fixed to base 17 on the same side as right angle flange 18 and is substantially coextensive with the surface of base 17. Pad 19 is formed of a flexible sheet-like permanently magnetized material in strip form, such as a material with suspensions of magnetized barium ferrite and other similar materials being held in a base of rubber, polyvinyl chloride or other plastic materials. Pad 19 can have a greater magnetic flux on one surface than the other. Pad 19 can magnetically adhere to the base 17 or, alternatively, can be adhered to base 17 by other means, such as bonding with a suitable glue or the like. The opposite surface of pad 19 magnetically adheres to the major side surface 12 of metal wall stud 11 to properly position base 17 and secure it with respect to the wall stud 11. The surface of pad 19 is flexible such that it is able to ride over any small irregularities on the surface of major side member 12.

Figure 4:
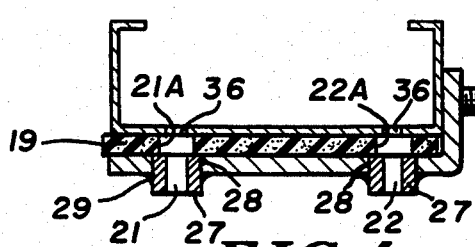
FIG. 4 is a sectional view of a portion of the template and wall stud shown in FIG. 3 taken along the line 4—4 thereof having mounting holes formed in the wall stud.

Base 17 carries template openings 21–24 comprised as circular openings for guiding a conventional drill bit like the bit 26 shown in FIG. 1, for the formation of drilled holes in major side member 12 of wall stud 11. As shown in FIG. 4, each opening 21–24 is defined by a cylindrical tubular bushing 27 fitted in a circular opening 28 formed in base 17 and secured there by suitable means, such as a weld 29.

Template openings 21–24 are arranged in a rectangular pattern for formation of a rectangular hole pattern on the major side member 12 of wall stud 11. Such a hole pattern is useable, for example, for the mounting of an electrical receptacle box assembly of the type having an electrical receptacle box having a plurality of parallel resilient tines extended away from the box having tips adapted to be mounted in mounting holes provided in such a pattern in a metal wall stud, as shown in co-pending application Ser. No. 399,473, now U.S. Pat. No. 4,403,708. Other hole patterns or shapes of template openings could be provided according to the particular use for the template. Additional drill holes, as shown in broken lines in FIG. 3, could be provided.

Magnetic pad 19 has openings corresponding in location to the template openings in base 17 shown to include the openings 21A, 22A in FIG. 4. The openings provided in flexible pad 19 correspond in position but are preferably slightly larger than the template openings in the base 17 whereby adjacent edges of the pad 19 will not interfere with the template operation.

A U-shaped handle 32 has outwardly extended feet 33 secured proximate one end of base 17 on the side opposite pad 19 for securing and removal of template 10 from wall stud 11. In use, template 10 is installed in upright fashion on wall stud 11, as shown in FIG. 1 with right angle flange 18 properly positioning the base 17 in up and down relationship so that template openings 21-24 are properly orientated. If pad 19 is magnetically adhered to base 17, it is orientated such that the magnetic attraction between the base 17 and pad 19 is greater than that between the pad 19 and the major side member 12 of wall stud 11. In such position, a drill bit 26 is useable to form mounting openings indicated at 36 in FIG. 4 in major side member 12. Upon completion of the forming of the openings, handle 32 is used to remove template 10 from the wall stud 11.

Figure 5:
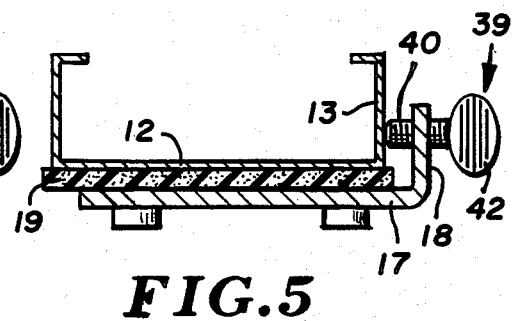
FIG. 5 is a sectional view of a portion of the template shown in FIG. 3 taken along the line 5—5 thereof but also showing use of an adjustment member to adjust the position of the template on the wall stud.

Normally right angle flange 18 will properly position base 17 laterally with respect to wall stud 11. However, there may be instances when it is necessary to adjust the position of the base 17, as when the wall stud 11 has surface irregularities or is disposed at a slight angle or the like. Accordingly, there are provided adjusting members 38, 39 to provide some measure of lateral adjustment of base 17. Each adjusting member 38, 39 has a shank 40 which is threaded through a suitable opening provided in right angle flange 18 with an inward end adapted for contact with a side member of wall stud 11. Each adjusting member 38, 39 also has a thumb screw head 42 at the opposite end of shank 40 adapted to be manually grasped by the fingers of a person using template 10 and rotated so as to move the base 17 laterally with respect to the major side member 12 of wall stud 11. As shown in FIG. 5, shank 40 of adjusting member 39 is rotated by rotation of thumb screw head 42 to bear against the side wall 13 of wall stud 11. This movement laterally offsets the base 17 with respect to the major side member 12 to properly orientate the template openings 21-24.

While a rectangular drill hole pattern of template opening has been described, it is apparent that other openings could be provided of different shapes and sizes for the purpose of guiding a cutting tool, providing an opening for tracing a shape, or other purposes. Other deviations could be had from the embodiment of the invention shown without departing from the scope and spirit of the invention.

The embodiments of the invention in which an exclusive property or privilege is claimed are defined as follows:

1. A template assembly useable with respect to the formation of a hole pattern in a magnetically attractive surface, comprising:
    a ferromagnetic metal wall stud having a major side member and a perpendicular end member;
    a generally flat rectangular, rigid base comprised of ferromagnetic material and having a width substantially equal to the width of the major side member of the metal wall stud;
    a flexible magnetized pad magnetically adhered on a first side to a side of the base and substantially coextensive with the side of the base, said pad having a second side facing away from the base, said first side of the pad having a greater magnetic flux than the second side, said second side releasably, magnetically adhered to the metal wall stud preparatory to the formation of a hole pattern, said pad having a generally rectangular shape with a width substantially equal to that of the base;
    template openings in the base describing a mounting hole pattern;
    openings in the magnetized pad corresponding in location to the template openings in the base for access through the template openings for the formation of a hole pattern in the major side member of the stud; and
    a right angle flange extended from an edge of the base on the side carrying the magnetized pad positioned to abut the end member of a metal wall stud and properly orientate the template opening of the base with respect to the major side member.

2. The template of claim 1 including: a pair of adjustment members, each having a threaded shank engaged in a threaded opening in the flange and rotatable to adjust the position of the base.

3. The template of claim 1 wherein: said openings in the magnetized pad is larger than the template opening.

4. The template of claim 1 wherein: said template openings comprises a plurality of drill holes to accommodate a drill bit to form holes in said magnetically attractive surface.

5. The template of claim 4 including: a corresponding plurality of cylindrical tubular bushings with central opening defining said drill holes.

6. The template of claim 5 wherein: said drill holes are comprised as a pattern of four rectangularly orientated drill holes.

7. The template of claim 1 including: a handle mounted on said base on the side opposite the magnetized pad.

8. A template useable in the formation of a mounting hole pattern on a ferromagnetic metal wall stud of the type having a generally U-shaped cross section with a major side member and a perpendicular end member, comprising:
    a generally rectangular flat rigid ferromagnetic base configured with a width substantially equal to that of the major side member of the metal wall stud in order to fit on the major side member of the metal wall stud;
    a flexible magnetized pad secured on one side to a first side of the base and having a width substantially equal to the width of the base to be coextensive with the first side of the base for placement against the major side member of the metal wall stud to magnetically adhere the base to the major side member of the wall stud;
    template opening in the base comprised as a plurality of drill hole openings arranged in a mounting hole pattern;
    a right angle flange extended continuously along an edge of the base on the side carrying the magnetized pad positioned to abut the end member of a metal wall stud, said drill hole openings in the base being spaced from the flange to properly orientate them with respect to the major side member;
    a plurality of openings in the magnetized pad corresponding in location to the drill hole openings in the base for access with a drill through the drill hole openings in the base;
    a first adjustment member located toward one end of the flange and a second adjustment member located toward the opposite end of the flange for making slight adjustments to the positioning of the holes in the base with respect to the major side member, each adjustment member including a threaded shank threaded though an opening in the right-angle flange and having an end engageable with the end member of the metal stud, and a thumb screw member at the opposite end of the shank adapted to be manually turned; and a handle fixed to a second side of the base opposite the first side for removal of the base from a metal wall stud upon completion of formation of mounting holes.

9. The template of claim 8 wherein: said openings in the magnetized pad are slightly larger than the drill hole openings in the base.

10. The template of claim 9 wherein: said drill hole openings form a generally rectangular pattern.

11. The template of claim 10 including: a plurality of cylindrical tubular bushings defining said drill hole openings.

* * * * *